US006604076B1

(12) United States Patent
Holley et al.

(10) Patent No.: US 6,604,076 B1
(45) Date of Patent: Aug. 5, 2003

(54) SPEECH RECOGNITION METHOD FOR ACTIVATING A HYPERLINK OF AN INTERNET PAGE

(75) Inventors: Martin Holley, Vienna (AT); Dieter Kubesch, Mauerbach (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 324 days.

(21) Appl. No.: 09/709,261

(22) Filed: Nov. 9, 2000

(30) Foreign Application Priority Data

Nov. 9, 1999 (EP) .............................. 99890359

(51) Int. Cl.[7] .................. G10L 21/06; G10L 15/26; G10L 15/04
(52) U.S. Cl. ................ 704/270.1; 704/275; 704/235; 704/251
(58) Field of Search ................ 704/270, 270.1, 704/275, 235, 231

(56) References Cited

U.S. PATENT DOCUMENTS

| | | | | | |
|---|---|---|---|---|---|
| 5,890,123 | A | * | 3/1999 | Brown et al. | 704/270.1 |
| 6,029,135 | A | * | 2/2000 | Krasle | 704/275 |
| 6,122,613 | A | * | 9/2000 | Baker | 704/235 |
| 6,138,100 | A | * | 10/2000 | Dutton et al. | 704/275 |
| 6,188,985 | B1 | * | 2/2001 | Thrift et al. | 704/275 |
| 6,282,511 | B1 | * | 8/2001 | Mayer | 704/270 |
| 6,311,182 | B1 | * | 10/2001 | Colbath et al. | 704/231 |

FOREIGN PATENT DOCUMENTS

| | | | |
|---|---|---|---|
| EP | 0847179 A2 | 6/1998 | |
| NL | WO 01/35390 A1 | * 5/2001 | .......... G10L/15/22 |

* cited by examiner

Primary Examiner—Doris H. To
Assistant Examiner—Daniel A. Nolan
(74) Attorney, Agent, or Firm—Daniel J. Piotrowski

(57) ABSTRACT

A speech recognition method is disclosed for activating a hyperlink of an Internet page. In particular the method comprises determining hypertexts of the hyperlinks in text information, determining corresponding first phoneme sequences of hypertexts, receiving a spoken command from a user, determining a second phoneme sequence corresponding to the spoken command, determining the hyperlink selected by the user using the first and second phoneme sequences, activating the selected hyperlink, where one quality value is determined for each hypertext when first phoneme sequences are determined and where an extra hypertext is determined when the quality value of a hypertext is below a threshold and is assigned to the hypertext of the Internet page or in lieu of the hypertext, and where a first phoneme sequence determined for the extra hypertext has a quality value that exceeds the threshold.

8 Claims, 3 Drawing Sheets

| PI1[HT(HL)] | PI1[ZHT(HL)] | URL(HL) |
|---|---|---|
| PI1(1) |  | http://www.philips.product.com |
| PI1(2) |  | http://www.philips.purchase.com |
| PI1(3) | PI1(3) | http://www.philips.speechmike.com |
| PI1(4) | PI1(4) | http://www.philips.development.com |
| PI1(5) | PI1(5) | http://www.philips.speech.fr |

SPEECH RECOGNITION METHOD FOR ACTIVATING A HYPERLINK OF AN INTERNET PAGE

BACKGROUND OF THE INVENTION

The invention relates to a speech recognition method in accordance with the introductory part of claim 1, to a speech recognition device in accordance with the introductory part of claim 4 and to a computer program product in accordance with the introductory part of claim 7.

SUMMARY OF THE INVENTION

Such a speech recognition method for activating a hyperlink of text information of an Internet site shown to a user, such a speech recognition device and such a computer program product are known from the document EP 0 847 179 A2. The known speech recognition device is formed by a computer which executes the known speech recognition method when the computer program product runs on the computer. The computer is connected to the Internet and the known speech recognition device is arranged for receiving text information of an Internet page from a computer server connected to the Internet.

The received text information of an Internet site is HTML coded and usually also contains so-called hyperlinks in addition to text. A hyperlink comprises a hypertext that can be displayed with a monitor of the computer and an assigned Internet address. The hypertext is normally displayed underlined or reproduced acoustically with a different emphasis to distinguish it from other texts of the text information of the Internet page. When such a hyperlink is activated—for example, by clicking a cursor controlled by a mouse—the text information of the Internet page featured by the Internet address of the activated hyperlink is extracted by a computer server connected to the Internet and displayed by the monitor.

The known speech recognition device includes hyperlink identification means with which the hypertexts of the hyperlinks in the text information of a received Internet page are determined. For the hypertexts determined by the hyperlink identification means correlation means of the speech recognition device determine first phoneme sequences corresponding to these hypertexts and store them. When the first phoneme sequences are determined, the correlation means compare text portions of the hypertexts with a large number of words stored in a word memory. If a large correspondence is established of a text portion of one of the hypertexts with a word of the word memory, a phoneme sequence stored in the word memory and assigned to this text portion is included in the first phoneme sequence of this hypertext.

If a user wishes to activate a hyperlink displayed by the monitor and contained in the text information, so as to obtain the text information of the corresponding Internet page displayed by the monitor, he pronounces the word or the words of the hypertext of this hyperlink as a spoken command into a microphone connected to the computer.

The known speech recognition device includes receiving means for receiving an audio signal corresponding to the spoken command. The known speech recognition device further includes speech recognition means for determining a second phoneme sequence corresponding to the received audio signal of the spoken command. By comparing the determined second phoneme sequence of the spoken command with stored first phoneme sequences of hyperlinks that can be activated, the speech recognition means further determine the first phoneme sequence corresponding to the second phoneme sequence and the Internet address assigned to the hypertext of this first phoneme sequence. The computer then extracts the text information of the Internet page of the computer server featured by the Internet address and the monitor of the computer displays or acoustically reproduces this text information.

With the known speech recognition method, with the known speech recognition device and with the known computer program product it has proved to be disadvantageous that the quality of the first phoneme sequences determined by the correlation means for the hypertexts are often very poor. This may happen, for example, when in the word memory of the correlation means only words in English are stored and the hypertext is formed by French or Spanish words. If, however, the quality of the determined first phoneme sequences of all or several hypertexts of an Internet page is poor, it is impossible with the speech recognition means to activate the hyperlink corresponding to the spoken command, which is a major drawback.

It is an object of the invention to eliminate the problems described above and provide an improved speech recognition method, an improved speech recognition device and an improved computer program product. This object is achieved with such a speech recognition method by the measures forming the characterizing part of claim 1, with such a speech recognition device by the measures forming the characterizing part of claim 4 and with such a computer program product by the measures forming the characterizing part of claim 7.

As a result, when the first phoneme sequences corresponding to the hypertexts of the hyperlinks are determined, a quality value is determined for each first phoneme sequence and compared to a quality threshold. When such a comparison shows that a determined first phoneme sequence has a poor quality, an extra hypertext is determined for this hyperlink by the correlation means and additionally inserted into the text information of the Internet page and displayed on the monitor before or after the hypertext or in lieu of the hypertext. The correlation means define the additional hypertext so that a first phoneme sequence determined for the extra hypertext by the correlation means has a high quality value and that between the hypertext and the extra hypertext there is an abstract link, as appropriate.

This offers the advantage that a user by speaking the words of the hypertext of a hyperlink or by speaking the words of an extra hypertext of the hyperlink shown in addition to or in lieu of the hypertext can have an effect on the hyperlink by activating and receiving and displaying the text information of the Internet page featured by the hyperlink. It is then particularly advantageous that all the hyperlinks of an Internet page can constantly, very reliably be activated by spoken commands.

With the speech recognition method as claimed in claim 1 and with a speech recognition device as claimed in claim 4 it has proved to be advantageous to display a number as extra hypertext, because a number needs little space for being displayed in the text information of an Internet page.

It is particularly advantageous, when the numerical value is determined, to take this number into consideration prior to hypertexts or extra hypertexts contained and reproduced in the text information of the Internet page. If, for example, the numerical value "10" is determined and displayed as extra hypertext for the tenth hyperlink contained in the text information, the user also receives the information that nine other hyperlinks in the Internet page can be activated prior to this, even if the first part of the text information is not displayed on the monitor.

With a computer program product as claimed in claim 7 it has proved to be advantageous to store this product on a medium that can be read by a computer to simplify transport and installation of the computer program product.

The invention will be described in the following with reference to two examples of embodiment shown in the Figures, to which examples of embodiment, however, the invention is not restricted.

DESCRIPTION OF THE PREFERRED EMBODIMENTS

Figure 1:
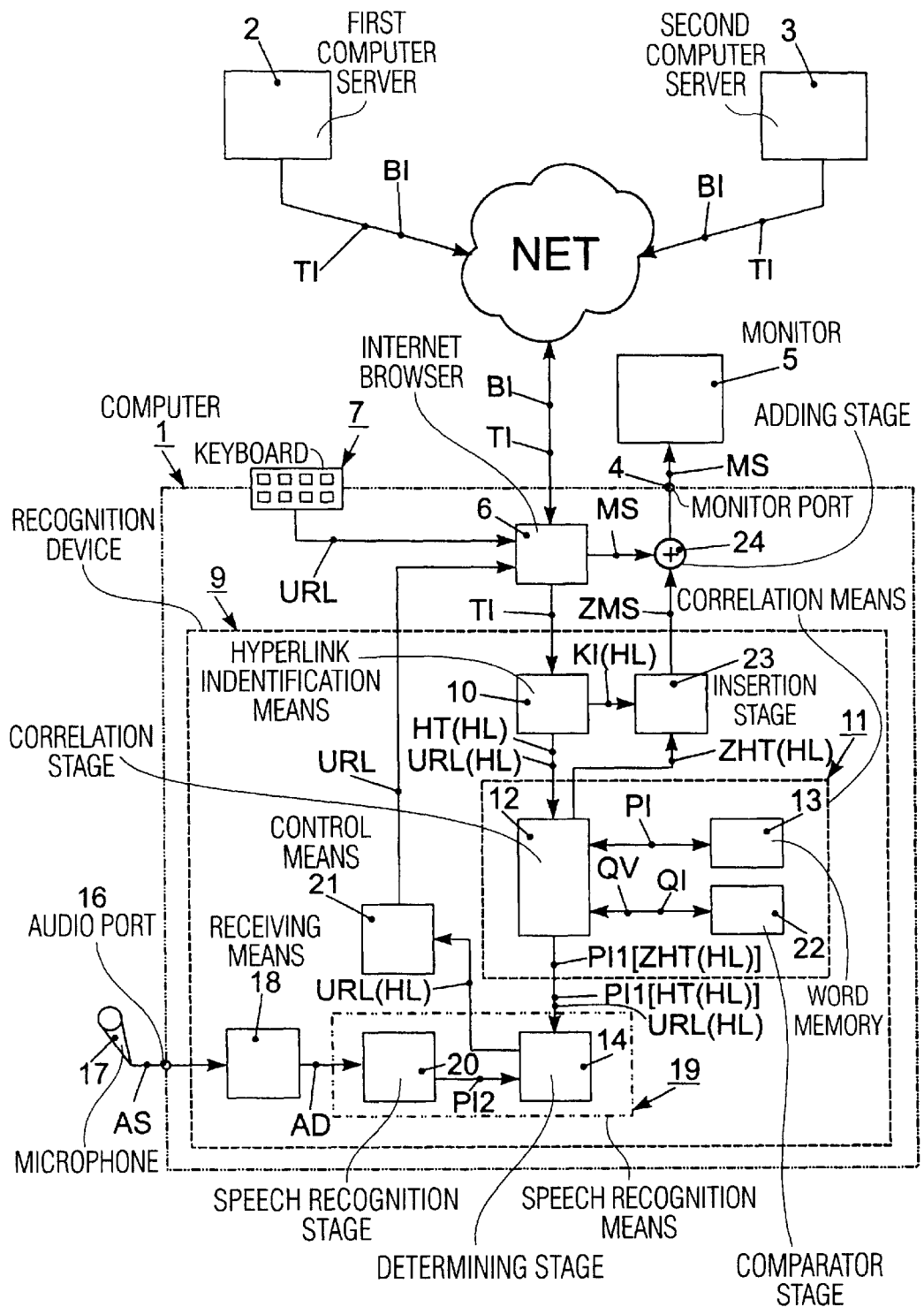
FIG. 1 diagrammatically shows in the form of a block circuit diagram a speech recognition device which is arranged for controlling an Internet browser in accordance with a speech recognition method, while the Internet browser is arranged for receiving Internet-page text information containing a hyperlink.

FIG. 1 diagrammatically shows in the form of a block circuit diagram a computer 1, a first computer server 2 and a second computer server 3, which are all connected to the Internet NET. Connected to a monitor port 4 of the computer 1, a monitor 5 is connected by which picture information BI and text information TI of an Internet page can be displayed. A monitor signal MS containing picture information BI and text information TI can be fed to the monitor 5 from the monitor port 4 of the computer 1.

A first computer program product which, when the computer 1 is in operation, forms a so-called Internet browser 6 can be stored in an internal memory of the computer 1. The first computer program product contains software code sections and may be formed, for example, by the known computer software Microsoft Explorer® by Microsoft or, for example, by the known computer software Netscape Navigator® registered by Netscape.

To the Internet browser 6 can be fed via a keyboard 7 an Internet address URL and the Internet browser 6 in response thereto is arranged for searching for the computer server 2 or 3 connected to the Internet NET and featured by the Internet address URL. Once the computer server 2 or 3 searched for has been found, the Internet browser 6 is arranged for extracting and receiving the Internet page featured by the Internet address URL and stored by the computer server 2 or 3, which page mostly contains text information TI and picture information BI and is HTML encoded. The Internet browser 6, after reception of the text information TI and picture information BI of an Internet page, is arranged for applying the monitor signal MS containing this information to the monitor port 4.

Figures 2, 3:
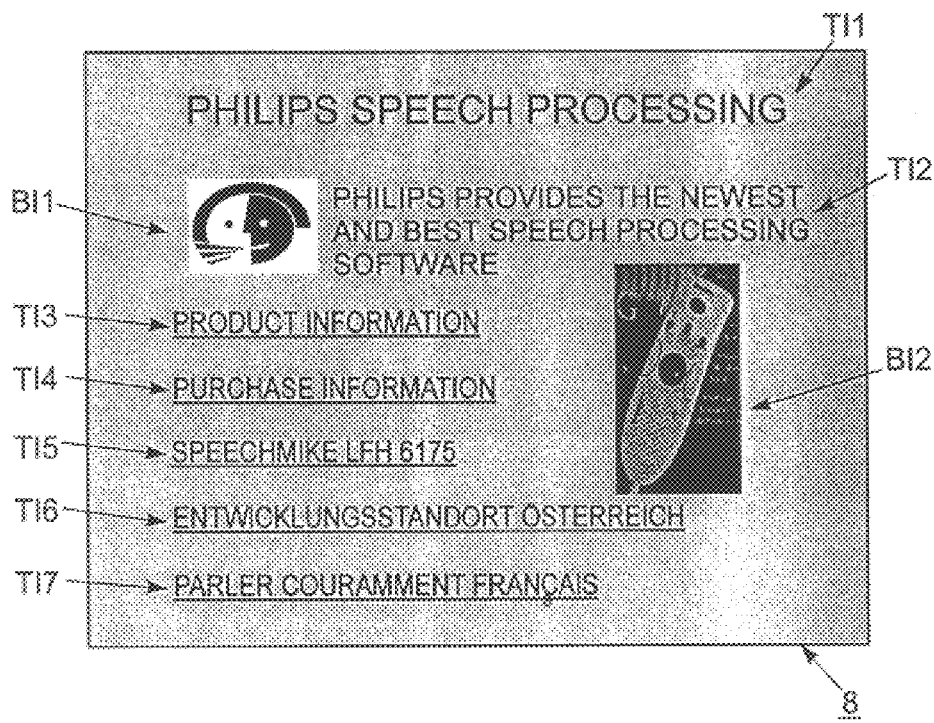
FIG. 2 shows, displayed by a monitor, text information and picture information of an Internet page.
FIG. 3 shows a command table stored in a command word switching stage of the speech recognition device shown in FIG. 1.

In a FIG. 2 is shown an Internet page 8, which can be displayed or reproduced respectively by the monitor 5. The Internet page 8 contains text information TI1 and TI2 as well as picture information BI1 and BI2. The Internet page 8 contains further text information TI3, TI4, TI5, TI6 and TI7, which are shown underlined and form hypertexts HT(HL) of so-called hyperlinks HL. Each hyperlink contains both a hypertext HT(HL) and an Internet address URL(HL) of the hyperlink HL assigned to the hypertext HT(HL) which, however, is not displayed by the monitor 5.

When a user of the computer 1—for example by actuating keys of the keypad 7—selects one of the represented hypertexts TI3 to TI7 and thus activates the hyperlink HL, the Internet browser 6 loads text information TI and picture information BI of the Internet page featured by the Internet address URL(HL) of the activated hyperlink HL, as this was described above.

In the internal memory of the computer 1 can further be stored a second computer program product which, when it runs on the computer 1, forms a speech recognition device 9, as the result of which the computer 1 executes a speech recognition method. The speech recognition device 9 is arranged for controlling the Internet browser 6. For this purpose, the speech recognition device 9 is arranged for delivering the Internet address URL of an Internet page selected by a user of the computer 1 via a spoken command.

The speech recognition device 9 has hyperlink identification means 10. To the hyperlink identification means 10 can be applied text information TI of the Internet page 8 displayed by the monitor 5 and determined by the Internet browser 6. The hyperlink identification means 10 are arranged for determining the text information TI3 to TI7 of hypertexts HT(HL) of the hyperlink HL from the text information TI of the received Internet page 8. This text information TI3 to TI7 can be delivered as hypertexts HT(HL) of the hyperlink HL of the Internet page 8 by the hyperlink identification means 10.

The hyperlink identification means 10 are further arranged for determining the Internet addresses URL(HL) of the hyperlink HL—not shown in FIG. 2—from the text information TI of the received Internet page 8. To each hypertext HT(HL) of a hyperlink HL that can be produced by the hyperlink identification means 10 can be assigned an Internet address URL(HL) of the hyperlink HL.

The speech recognition device 9 further includes correlation means 11 for determining first phoneme sequences PI1[HT(HL)] corresponding to these hypertexts HT(HL). For this purpose the correlation means 11 include a correlation stage 12 and a word memory 13. In the word memory 13 are stored 64,000 words in English as a so-called background lexicon. Stored in the word memory 13 and assigned to each of these words is a phoneme sequence PI, which corresponds to the acoustic pronunciation of this word.

The correlation stage 12 is arranged for determining a first phoneme sequence PI1[HT(HL)] for each hypertext HT(HL) of a hyperlink HL delivered to the correlation stage 12 by the hyperlink identification means 10. The correlation stage 12 is then arranged for comparing text portions of the hypertext HT(HL) of a hyperlink HL with words stored in the word memory 13. When a large degree of correspondence has been detected between a text portion of the hypertext HT(HL) of the hyperlink HL with a word of the word memory 13, the phoneme sequence PI assigned to this word and stored in the word memory 13 is incorporated in the first phoneme sequence PI1[HT(HL)] of this hypertext HT(HL).

The speech recognition device 9 further includes a command word determining stage 14 by which a command table 15 shown in FIG. 3 is stored. In a first column of the command table 15 are stored the first phoneme sequences PI1[HT(HL)] determined by the correlation stage 12 and delivered to the command word determining stage 14. In a third column of the command table 15 are stored the Internet addresses URL(HL) of the hyperlink HL determined by the hyperlink identification means 10 and delivered to the command word determining stage 14 by the correlation stage 12.

This achieves that in the command table 15 of the command word determining stage 14 are stored first phoneme sequences PI1[HT(HL)] and Internet addresses URL (HL) for each hyperlink HL of the Internet page 8 displayed by the monitor 5. The hypertexts HT(HL) of the phoneme sequences PI1[HT(HL)] stored in the command word determining stage 14 form the spoken commands that can be recognized by the speech recognition device 9 when the Internet page 8 is displayed by the monitor 5.

The computer 1 has an audio port 16 to which a microphone 17 can be connected to the computer 1. A user of the computer 1 can speak a command into the microphone 17, after which an audio signal AS corresponding to the command is delivered to the audio port 16 by the microphone 17. For activating a hyperlink HL the user can speak a part of or also the whole text information TI3, TI4, TI5, TI6 or TI7 of a hypertext HT(HL) of a hyperlink HL into the microphone 17 as a command.

The speech recognition device 9 further includes receiving means 18 for receiving an audio signal AS of a user-uttered command applied to the audio port 16. The receiving means 18 include an input amplifier for amplifying the audio signal AS and an analog-to-digital converter for digitizing the analog audio signal AS. The receiving means 18 can produce digital audio data AD representing the command uttered by the user.

The speech recognition device 9 further includes speech recognition means 19 for determining a second phoneme sequence PI2 corresponding to the spoken command and for determining the hyperlink HL selected by the user by comparing the determined second phoneme sequence PI2 with the first phoneme sequences PI1[HT(HL)] stored in the command word determining stage 14. For this purpose, the speech recognition means 19 include a speech recognition stage 20 and the command word determining stage 14.

The speech recognition stage 20 can be supplied with digital audio data AD which can be delivered by the receiving means 18. The speech recognition stage 20 is arranged for determining the second phoneme sequence PI2 corresponding to the digital audio data AD of the command spoken by the user, as this has already been known for a long time with speech recognition devices. A second phoneme sequence PI2 determined by the speech recognition stage 20 can be delivered by this stage to the command word determining stage 14.

After receiving a second phoneme sequence PI2 from the speech recognition stage 20. the command word determining stage 14 is arranged for comparing the second phoneme sequence PI2 with first phoneme sequences PI1[HT(HL)] stored in the command table 15. The command word determining stage 14 is further arranged for delivering the hyperlink HL Internet address URL(HL) stored in the command table 15, whose first phoneme sequence PI1[HT(HL)] of the hypertext HT(HL) corresponds best to the second phoneme sequence PI2 delivered to the command word determining stage 14.

The speech recognition device 9 further includes control means 21 for controlling the Internet browser 6 to enable receiving text information TI and picture information BI of the Internet page featured by the hyperlink HL selected by the user. For this purpose the hyperlink HL Internet address URL(HL) determined by the command word determining stage 14 can be applied to the control means 21. The control means 21 form an interface to the Internet browser 6 and deliver the Internet address URL(HL) of the selected hyperlink HL applied to the control means 21 to the Internet browser 6 in a data format, so that the respective computer program product can immediately process the Internet address URL.

This achieves that for selecting a hyperlink HL of the Internet page 8 shown on the monitor 5 a user can speak one of the text information signals TI3 to TI7 into the microphone 17 as a command and the Internet page featured by the Internet address URL(HL) of the selected hyperlink is automatically extracted by the respective Internet server 2 or 3 and displayed by the monitor 5.

The correlation means 11 are henceforth arranged so that when first phoneme sequences PI1[HT(HL)] corresponding to the hypertexts HT(HL) are determined, a quality value QV is determined for each hypertext HT(HL) and in that, if the quality value QV of a hypertext HT(HL) falls short of a quality threshold QS, an extra hypertext ZHT(HL) is determined and assigned to the hypertext HT(HL) in the text information TI of the Internet page, or is displayed instead of the hypertext HT(HL), while a first phoneme sequence PI1[ZHT(HL)] determined for the extra hypertext ZHT(HL) has a quality value QV that exceeds the quality threshold QS.

For determining a quality value QV for each first phoneme sequence PI1[HT(HL)] determined by the correlation stage 12, the correlation stage 12 is arranged for determining and evaluating various evaluation criterions when the first phoneme sequences PI1[HT(HL)] are determined. The most important one of these evaluation criterions is the length evaluation criterion.

When a first phoneme sequence PI1[HT(1)] is determined by the correlation stage 12 for the hypertext HT(1) of the first hyperlink HL="1" of the Internet page 8 having the text information TI3="PRODUCT INFORMATION", and English words are stored in the word memory 13 as a background lexicon, whereas both the word "PRODUCT" and the word "INFORMATION" and phoneme sequences PI associated to these words are stored in the word memory 13, the first phoneme sequence PI1[HT(l)] can directly be formed from the phoneme sequences PI of these two words. The length evaluation criterion of this first phoneme sequence PI1[HT(1)] for the text information TI3 containing "19" digits in all, therefore indicates that only two phoneme sequences PI of the word memory 13 must be combined to copy the text information TI3 as a first phoneme sequence PI1[HT(1)]. The evaluation of this length evaluation criterion by the correlation stage 12 thus produces a high quality value QV for the qualitatively high-value first phoneme sequence PI1[HT(1)] of the first hyperlink HL="1" of the Internet page 8.

When, on the other hand, a first phoneme sequence PI1[HT(3)] is determined by the correlation stage 12, or the hypertext HT(3) of the third hyperlink HL="3" of the Internet page 8 having the text information TI5= "SPEECHMIKE LFH 6175", the first phoneme sequence PI1[HT(3)] must be formed from a relatively large number of phoneme sequences PI stored in the word memory 13 of words such as, for example, "SPEECH" and letters such as "L". The length evaluation criterion of this first phoneme sequence PI1[HT(3)] for the text information TI5 containing "19" digits in all therefore indicates, for example, that nine phoneme sequences PI must be combined to copy the text information TI5 as the first phoneme sequence PI1[HT(3)]. The evaluation of this length evaluation criterion by the correlation stage 12 thus produces a low quality value QV for the qualitatively poor first phoneme sequence PI1[HT(3)] of the third hyperlink HL="3" of the Internet page 8.

Very low quality values QV are produced for the text information TI6 of the fourth hyperlink HL—"4" in German and for the text information TI7 of the fifth hyperlink HL="5" in French of the Internet page 8, because with the word memory 13 containing only words in English it is very hard to copy words in another language. Hyperlinks HL whose hypertexts HT(HL) have poor quality values QV and are therefore relatively hard to copy can very poorly be activated with a spoken command because the recognition rate of the speech recognition means 19 is very low for such spoken commands.

Further evaluation criterions for the quality of the phoneme sequence PI1[HT(HL)] determined by the correlation stage 12 are the result of heuristic and statistical methods which are known to the expert in the field of speech recognition methods.

To obtain a high recognition rate of the speech recognition means 19 for all spoken commands for activating a hyperlink, the correlation means 11 include a comparator stage 22 which is arranged for comparing quality values QV of first phoneme sequences PI1[HT(HL)] applied to the comparator stage 22 with the quality threshold QS stored in the comparator stage 22. When the quality value QV of the first phoneme sequence PI1[HT(HL)] of a hyperlink HL stays below the quality threshold QS, the comparator stage 22 is provided for delivering quality information QI to the correlation stage 12 which quality information QI features this hyperlink HL.

The correlation stage 12, when receiving quality information QI featuring a hyperlink HL, is arranged for determining an extra hypertext ZHT(HL) for this hyperlink HL, whose phoneme sequence PI1[ZHT(HL)] determined by the correlation stage 12 has a very good quality value QV. The first phoneme sequences PI1[ZHT(HL)] of extra hypertexts ZHT(HL), which sequences are determined with poor quality values QV by the correlation stage 12, are applied by the correlation stage 12 to the command word determining stage 14 and stored in a second column of the command table 15.

These extra hypertexts ZHT(HL) are also delivered to an insertion stage 23 of the speech recognition means 9 by the correlation stage 12. The insertion stage 23 can furthermore be supplied by the hyperlink identification means 10 with co-ordination information KI(HL) about each hyperlink HL of the Internet page 8 displayed by the monitor 5. The co-ordination information KI(HL) of a hyperlink HL then features the position of the hyperlink HL inside the Internet page 8 shown.

The insertion stage 23 is arranged for producing an additional monitor signal ZMS which contains the extra hypertext ZHT(HL) delivered to the insertion stage 23. In an adding stage 24 the monitor signal MS delivered by the Internet browser 6 is added to the additional monitor signal ZMS, after which the monitor signal MS delivered to the monitor port 4 also contains the extra hypertexts ZHT(HL). The extra hypertext ZHT(HL) of a hyperlink HL is then positioned so close to the hypertext HT(HL) of this hyperlink HL inside the Internet page and shown, that for the user a direct assignment is given. The extra hypertext ZHT(HL) of a hyperlink HL can, however, also be positioned at the position of the hypertext HT(HL) of this hyperlink HL and, as a result, completely replace the hypertext HT(HL) in the representation of the Internet page.

In consequence, it is advantageously achieved that a user receives extra hypertexts ZHT(HL) in displayed version for hyperlinks HL whose first phoneme sequences PI1[HT(HL)] have a poor quality value QV and can therefore be activated only poorly with spoken commands which can be spoken by the user as a command to activate one of the hyperlinks HL. It is then particularly advantageous that first phoneme sequences PI1[ZHT(HL)] of the extra hypertext ZHT(HL) have very good quality values QV and, therefore, such hyperlinks HL can extremely reliably be activated by uttering extra hypertexts ZHT(HL), because the recognition rate of the speech recognition means 19 is extremely high for these extra hypertexts ZHT(HL).

In the following will be further explained the advantages of the invention with reference to a first example of embodiment of the invention. In accordance with the first example of embodiment of the invention the correlation means 12 are arranged for determining extra information ZTI as extra hypertext ZHT(HL), which is formed by one or more words stored in the word memory 13. It is assumed that the user of the computer I has input with the keys of the keypad 7 the Internet address URL of the Internet page 8, after which the Internet browser 6 of the computer server 2 has extracted the text information TI1 to TI7 and picture information BI1 and BI2 and delivered same as a monitor signal MS to the monitor 5. Subsequently, the Internet page 8 shown in FIG. 2 is displayed on the monitor 5.

Then the hypertext identification means 10 determine the hypertexts HT(HL) and Internet addresses URL(HL) of the five hyperlinks HL of the Internet page 8, as this was explained above. First phoneme sequences PI1[HT(HL)] determined for the hyperlinks HL by the correlation means 11 and associated Internet addresses URL(HL) are then stored in the command table 15 with the command word determining stage 14. For the hyperlinks HL—"3", HL="4" and HL="5", whose first phoneme sequences PI1[HT(3)], PI1[HT(4)] and PI1[HT(5)] have a lower quality value QV than the quality threshold QS, the correlation stage 12 determines the extra hypertexts ZHT(HL) with extra text information ZTI(1)="THIRD LINK", ZTI(2) "FOURTH LINK" and ZTI(3)="FIFTH LINK" and stores corresponding first phoneme sequences PI1[ZHT(3)], PI1[ZHT(4)] and PI1[ZHT(5)] in the second column of the command table 15 with the command word determining stage 14.

Figure 4:
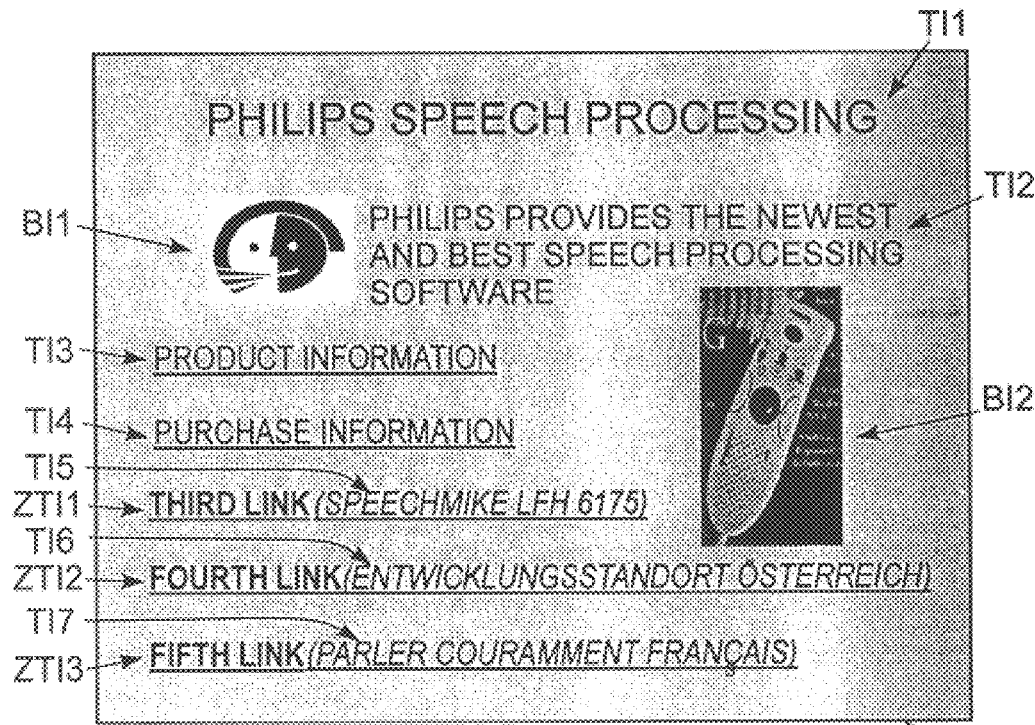
FIG. 4 shows the text information and picture information of the Internet page shown in FIG. 2 displayed by the monitor, with words being inserted into the text information as extra hypertexts.

In a FIG. 4 is shown an Internet page 25, which corresponds to the Internet page 8, on which the insertion stage 23 has inserted before the text information TI5 to TI7 of the hypertexts HT(HL)—in accordance with the first example of embodiment of the invention—the extra text information ZTI1 to ZTI3 of the extra hypertexts ZHT(HL). Advantageously, the text information TI5 to TI7 and the extra text information ZTI1 to ZTI3 is shown together on the Internet page 25 according to FIG. 4, because in this manner the text information TI5 to TI7 about what Internet pages can be downloaded and displayed by activating the respective hyperlink HL, is not lost.

By laying down these extra hypertexts ZHT(HL), two advantages are obtained. Firstly, the user recognizes from the meaning of the extra hypertexts ZHT(HL) that it is already the third, fourth or fifth hyperlink HL of the Internet page 8 and that therefore already two further hyperlinks HL must have occurred on the Internet page 8 before this hyperlink HL. Secondly, since the extra hypertexts ZHT (HL) are formed by words in English from the word memory 13, it is ensured that the quality values QV of these extra hypertexts are very good and the recognition rate of the speech recognition means 19 for the recognition of these extra hypertexts ZHT(HL) will be very high.

According to the first example of embodiment of the invention the user of the computer 1 can from now on control the Internet browser 6 by speaking the words "FOURTH LINK" into the microphone 17, so that an Internet page about the development centers of Austria is downloaded by the Internet server 3 featured by the Internet address URL(4)=http://www.philips.development.com and displayed by the monitor 5.

Advantageously, extra hypertexts ZHT(HL) are displayed only for such hyperlinks HL, for which first phoneme sequences PI1[HT(HL)] having only a low quality value QV could be determined and for which the recognition rate of the speech recognition means 19 would be poor. For all other hyperlinks HL, for which the first phoneme sequences PI1[HT(HL)] could be determined having a high quality value QV, no extra hypertext ZHT(HL) is displayed, so that, advantageously, room is saved in the display of the Internet page.

The advantages of the invention will be further explained in the following with reference to a second example of embodiment of the invention. In accordance with the second example of embodiment of the invention, the correlation means 12 are arranged for determining extra text information ZTI as extra hypertext ZHT(HL), which extra hypertext is formed by a number for which one or more respective words are stored in the word memory 13. In accordance with the first example of embodiment explained above, first the Internet page 8 shown in FIG. 2 is downloaded by the Internet server 2 and first phoneme sequences PI1[HT(HL)] are determined by the correlation means 10 and Internet addresses URL(HL) are determined by the hyperlink identification means 12 and entered in the command table 15 and stored by the command determining stage 14.

In accordance with the second example of embodiment for the first phoneme sequences PI1[HT(3)], PI1[HT(4)] and PI1[HT(5)] having a lower quality value QV than the quality threshold QS, the correlation stage 12 now determines as extra text information ZTI4, ZTI5 and ZTI6 numerical values for numbers that form extra hypertexts ZHT(HL). Advantageously, the numerical value of the determined numbers indicate to which hyperlink HL on the Internet page 8 the extra hypertext ZHT(HL) is assigned.

Figure 5:
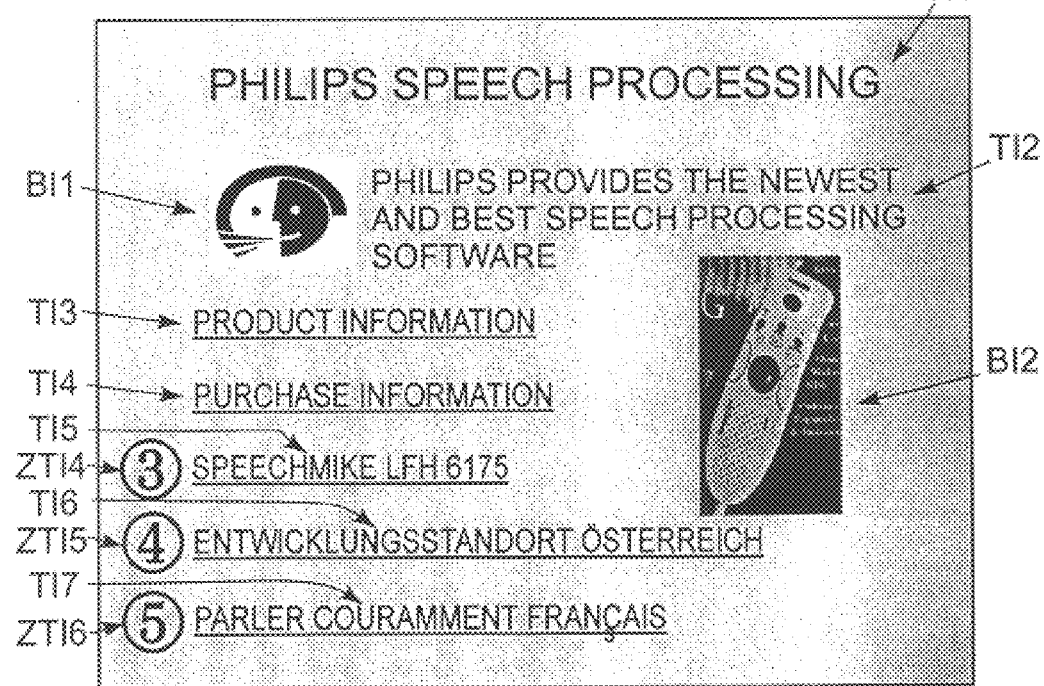
FIG. 5 shows the text information and picture information of the Internet page shown in FIG. 2 displayed by the monitor, with numbers being inserted into the text information as extra hypertexts.

In a FIG. 5 is shown an Internet page 26, which corresponds to the Internet page 8, for which the insertion stage 23 has inserted extra text information ZTI4, ZTI5 and ZTI6. For example, for the third hyperlink HL="3" the numerical value "3" was determined and inserted and represented as extra text information ZTI4. For activating the third hyperlink HL="3" the user can speak the words "THREE" or "THIRD", which are stored in the word memory 13 together with corresponding phoneme sequences PI, and whose phoneme sequences PI were taken over in the first phoneme sequence PI1[HT(3)] of the extra hypertext ZHT(HL) via the extra text information ZTI4.

Advantageously, the representation of the numbers on the Internet page 26 needs only very little space on the Internet page 26, as a result of which with relatively great certainty no text information TI or picture information BI of the original Internet page 8 is overwritten.

It may be observed that the correlation means 11 can also determine text information TI as extra hypertext ZHT(HL) which text information TI corresponds to a translation of a hypertext HT(HL) of a hyper link HL in the language of the words of the background lexicon. For example, the text information TI7="PARLER COURAMMENT FRANCAIS" in French could be translated by the correlation stage 12 into extra text information ZTI="SPEAKING FRENCH FLUENTLY" in English, where then the first phoneme sequence PI1[ZHT(HL)] could be formed by the three words "SPEAKING", "FRENCH" "FLUENTLY" in the phoneme sequences PI assignedly stored in the word memory 13. This first phoneme sequence PI1[ZHT(HL)] would have a high quality value QV and the insertion means 23 could insert the extra text information ZTI in lieu of the text information TI7 on the Internet page 26 so that, advantageously, both a high recognition rate of the speech recognition means 19 would be achieved and room would be saved when the Internet page is displayed.

It may be observed that in accordance with the second example of embodiment a user can speak both the text information TI6 and the extra text information ZTI5 as a command for activating the fourth hyperlink HL="4".

It may be observed that the hypertext HT(HL) or the extra hypertext ZHT(HL) of a hyperlink HL, after the hyperlink HL was activated, could be blinking for, for example, three seconds before the control means 21 deliver the Internet address URL(HL) of the selected hyperlink HL to the Internet browser 6. This would achieve that during the three seconds the user has the possibility of making a change of the activation if the false hyperlink HL was activated.

It may be observed that the second computer program product can be loaded from a CD-ROM or a disc to the internal memory of the computer 1 and thus advantageously be installed in a very simple manner on the computer 1.

It may be observed that also words of two or more languages can be stored in the word memory. For example, words of French, Spanish or Italian could be stored in the word memory.

We claim:

1. A speech recognition method for activating a hyperlink of text information of an Internet page displayed to a user, the method comprising the following steps:

determining hypertexts of the hyperlinks in the text information shown and determining corresponding first phoneme sequences of these hypertexts and receiving a spoken command from a user which represents at least part of a determined hypertext, and determining a second phoneme sequence corresponding to the spoken command and determining the hyperlink selected by the user by comparison of the determined second phoneme sequence with determined first phoneme sequences and activating the selected hyperlink, wherein one quality value is determined for each hypertext when first phoneme sequences corresponding to the hypertexts is determined and in that an extra hypertext is determined when the quality value of a hypertext is below a quality threshold and is assigned to the hypertext in the text information of the Internet page or in lieu of the hypertext, while a first phoneme sequence determined for the extra hypertext has a quality value that exceeds the quality threshold.

2. The speech recognition method as claimed in claim 1, wherein the extra hypertext is formed by a number.

3. The speech recognition method as claimed in claim 2, wherein when the numerical value of the number is laid down, all the hypertexts represented above determined in the text information of the Internet page and assigned to the extra hypertext in the text information of the Internet page are taken into account.

4. A speech recognition device for controlling an Internet browser, which browser is arranged for receiving text information containing a hyperlink of an Internet page, comprising:

hyperlink identification means for determining hypertexts of the hyperlinkin the text information of the received Internet page and correlation means for determining corresponding first phoneme sequences based on these hypertexts and receiving means for receiving a spoken command from a user, which represents at least part of a determined hypertext, and speech recognition means for determining a second phoneme sequence corresponding to the spoken command and command word determining means for determining the hyperlink selected by the user by comparison of the determined second phoneme sequence with determined first phoneme sequences and control means for controlling the Internet browser to enable reception of the text information of the Internet page featured by the selected hyperlink, wherein the correlation means are arranged for determining one quality value per hypertext when the first phoneme sequences corresponding to the hypertexts are determined and in that the correlation means, when the quality value of a hypertext is below a quality threshold, is arranged for determining an extra hypertext for this hypertext, while the extra hypertext assigned to this hypertext or replacing this hypertext in the text information of the Internet page can be represented and one of the correlation means for the first phoneme sequence determined for the extra hypertext has a quality value that exceeds the quality threshold.

5. The speech recognition device as claimed in claim 4, wherein the correlation means are arranged for determining a number as extra hypertext.

6. The speech recognition device as claimed in claim 5, wherein, when the numerical value of the number is determined, the correlation means are arranged for taking all the hypertexts standing before the extra hypertext in the text information of the Internet page determined in the text information of the Internet page into account.

7. A computer program product which can be loaded directly into the internal memory of a digital computer and contains software code sections, wherein the steps of the method as claimed in claim 1 are made with a computer when the product runs on the computer.

8. The computer program product as claimed in claim 7, wherein the computer program is stored on a medium that can be read by the computer.

\* \* \* \* \*